United States Patent [19]

Koller et al.

[11] 4,152,114

[45] * May 1, 1979

[54] METHOD OF DYEING WITH DISPERSIBLE AZO ANILINO DYESTUFFS

[75] Inventors: Stefan Koller, Pratteln; Dieter Reinker; Hans R. Schwander, both of Riehen, all of Switzerland

[73] Assignee: Ciba-Geigy AG, Basel, Switzerland

[*] Notice: The portion of the term of this patent subsequent to Jul. 11, 1995, has been disclaimed.

[21] Appl. No.: 899,162

[22] Filed: Apr. 24, 1978

Related U.S. Application Data

[60] Division of Ser. No. 775,645, Mar. 7, 1977, Pat. No. 4,099,909, which is a continuation of Ser. No. 617,842, Sep. 29, 1975, abandoned, which is a continuation of Ser. No. 456,198, Mar. 29, 1974, Pat. No. 3,963,431, which is a continuation-in-part of Ser. No. 106,550, Jan. 14, 1971, abandoned.

[30] Foreign Application Priority Data

Jan. 16, 1970 [CH] Switzerland .......................... 628/70

[51] Int. Cl.$^2$ .......................... C09B 27/00; D06P 1/02
[52] U.S. Cl. ...................................... 8/41 C; 8/41 R; 8/179; 260/205; 260/207.5
[58] Field of Search ............... 8/41 C, 41 R; 260/205, 260/207.5

[56] References Cited

U.S. PATENT DOCUMENTS

| | | | |
|---|---|---|---|
| 2,264,303 | 12/1941 | Dickey .................................. | 260/205 |
| 2,768,160 | 10/1956 | Dickey et al. ...................... | 260/207.5 |
| 3,099,909 | 7/1958 | Koller et al. ......................... | 8/41 C |
| 3,125,402 | 3/1964 | Kruckenberg ...................... | 8/41 C |
| 3,963,431 | 6/1976 | Koller et al. ......................... | 8/41 C |

*Primary Examiner*—A. Lionel Clingman
*Attorney, Agent, or Firm*—Wenderoth, Lind & Ponack

[57] ABSTRACT

A class of dispersible phenyl-azo-aniline dyestuffs corresponding to the formula

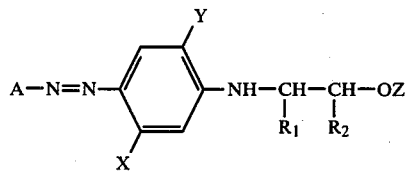

wherein
A is phenyl substituted by halogen, cyano, nitro, lower alkylsulphonyl, lower alkoxycarbonyl, di-lower-alkyl-carbamoyl or di-lower-alkyl-sulfamoyl,
X is hydrogen, lower alkyl or lower alkanoylamino,
Y is halogen or lower alkoxy-carbonyl,
Z is hydrogen or lower alkanoyl or chloroacetyl, of $R_1$ and $R_2$ one R is hydrogen and the other R is lower alkyl, cyclohexyloxy-lower alkyl, phenyl-lower-alkoxy-lower alkyl, phenoxy-lower alkyl, lower alkanoyloxy-lower-alkyl, cyano-lower-alkyl, brominated lower alkyl, chlorinated lower alkyl, lower alkoxy carbonyl, cyclohexyl, phenyl or phenyl substituted by bromine, chlorine, lower alkyl or lower alkoxy.

These dyestuffs are distinguished by good affinity and levelling and build-up properties especially for polyester fibres, affording dyeings on these fibres which have good fastness properties and especially good fastness to sublimation.

4 Claims, No Drawings

METHOD OF DYEING WITH DISPERSIBLE AZO ANILINO DYESTUFFS

This application is a division of application Ser. No. 775,645, filed Mar. 7, 1977, (now U.S. Pat. No. 4,099,909) which application in turn is a continuation of application Ser. No. 617,842, filed Sept. 29, 1975 (now abandoned), which application is a continuation of application Ser. No. 456,198, filed Mar. 29, 1974 (now U.S. Pat. No. 3,963,431), said application in turn being a continuation-in-part of application Ser. No. 106,550, filed Jan. 14, 1971 (now abandoned).

The present invention relates to the use of sparingly water-soluble azo dyestuffs usable as dispersion dyestuffs for the dyeing or printing of synthetic organic textile fibres, especially textile fibres made from linear polyesters of aromatic polycarboxylic acids with polyfunctional alcohols or from cellulose esters, and, as an industrial product, to the textile fibres dyed or printed with said dyestuffs.

A basic requirement for the successful dyeing of polyester fibres—in addition to satisfactory fastness properties on application and in use—is, as is known, an excellent affinity of the dispersion dyestuffs used for the purpose. The dyestuffs to be used have to satisfy particularly strict requirements, however, in the case of dyeing fibre material made from textured polyester, e.g. Crimplene ®, since this application it is indispensable that the dyestuffs possess, in addition to good fastness properties and adequate affinity, very good build-up and levelling properties.

Valuable, difficultly water-soluble azo dyestuffs have now been found which satisfy the above mentioned and further requirements. The new azo dyestuffs are free from water-solubilising groups which dissociate acid in water, and they correspond to formula I:

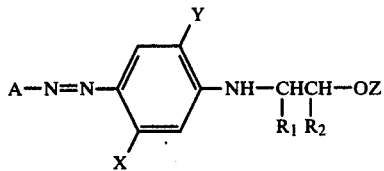

(I)

wherein
A represents the residue of an aromatic mono-amine selected from a phenyl radical which is substituted by halogen, cyano, nitro, lower alkylsulphonyl, lower alkoxy-carbonyl, N,N-di-lower alkyl-carbamoyl and/or N,N-di-lower alkyl-sulphamoyl groups, and an optionally substituted, benzo condensed heterocyclic radical of aromatic character,
X represents hydrogen, a lower alkyl or a lower alkanoylamino group,
Y represents halogen or a lower alkoxy-carbonyl group,
Z represents hydrogen or an acyl radical, and
of $R_1$ and $R_2$ one R represents hydrogen and the other R represents an optionally substituted lower alkyl, cycloalkyl or aryl radical, or a carboxylic acid ester group.

By water-solubilising groups which dissociate acid in water, which groups are not contained in the new dyestuffs, is meant, here and in the following, the known substituents which impart to the dyestuffs anionic character, e.g. sulphonic acid groups, carboxylic acid groups, or phosphoric acid groups.

The substituents listed for the phenyl radical A can be present singly or in any chosen double or, in special cases, triple combination.

Suitable halogen substituents of the phenyl radical A are, e.g. fluorine, chlorine or bromine. Examples of lower alkylsulphonyl groups on the phenyl radical A are the methylsulphonyl group, ethylsulphonyl group or butyl-sulphonyl group; suitable lower alkoxycarbonyl groups of the phenyl radical A are, e.g. the carbomethoxy, carbethoxy or the carbobutoxy group. If the phenyl radical A contains N,N-di-lower alkyl carbamoyl or sulphamoyl groups, then these substituents are e.g. di-methyl or diethyl carbamoyl or sulphamoyl groups.

If A represents a benzocondensed heterocyclic radical of aromatic character, then it concerns, in particular, radicals of the benzisothiazole or benzothiazole ring. These heterocycles can likewise contain non-ionic substituents of the above listed type which are usual in azo dyestuffs, especially halogens such as fluorine, bromine or chlorine, pseudohalogens such as cyano or thiocyano groups, nitro or lower alkylsulphonyl groups, as well as lower alkoxy groups.

If X in formula I is a lower alkyl group, then this group advantageously contain 1 to 4 carbon atoms; if X is a lower alkanoylamino group, then its alkanoyl radical is, e.g. the formyl, acetyl, propionyl or butyryl radical. Preferably, X represents hydrogen or a lower alkanoylamino group.

As halogen, Y represents, e.g. bromine, fluorine and, in particular, chlorine. As lower alkoxy-carbonyl group, Y represents, in particular, the carbomethoxy or carbethoxy group.

If one of $R_1$ and $R_2$ represents a lower alkyl radical, then this contains, in particular, 1 to 4 carbon atoms. If this alkyl radical is substituted, then suitable substituents are, e.g. lower alkoxy groups such as the methoxy or ethoxy group; cycloalkoxy groups such as the cyclohexyloxy group, phenyl-lower alkoxy groups such as the benzyloxy group, aryloxy groups, especially the phenoxy group, acyloxy groups, particularly lower alkanoyloxy groups such as the acetyloxy group, the cyano group, or halogens such as chlorine or bromine.

Suitable cycloalkyl groups denoted by $R_1$ or $R_2$ are, e.g. cycloalkyl groups having preferably 5- or 6-membered rings, and especially the cyclohexyl group.

If one of the symbols $R_1$ and $R_2$ represents an aryl radical, then this preferably belongs to the benzene series; it can contain usual non-ionic ring substituents. Mentioned as such substituents, especially on the phenyl radical, are, e.g. halogens such as fluorine, chlorine or bromine, lower alkyl or lower alkoxy groups.

As the carboxylic acid ester group, $R_1$ or $R_2$ represents, preferably, a lower alkoxycarbonyl such as the carbomethoxy, carbethoxy, carboisopropoxy or carbobutoxy group.

As an acyl radical, Z represents, in particular, a lower alkanoyl group which advantageously contains 2 to 4 carbon atoms. Preferably, Z represents hydrogen.

The word "lower" in front of the term "alkyl", "alkoxy" or "alkanoyl" signifies that the group, or the organic component of the group, contains at most 5 carbon atoms.

The azo dyestuffs of formula I are obtained by coupling the diazonium compound of an amine of formula II:

A—NH₂              (II)

wherein A has the meaning given under formula I with a coupling component of formula III:

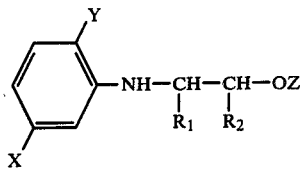  (III)

wherein X, Y, Z, $R_1$ and $R_2$ have the meanings given under formula I.

The starting materials of formulae II and III are thereby so chosen that the obtained azo dyestuff contains no water-solubilising groups which dissociate acid in water.

Preferred azo dyestuffs, according to the invention, are azo compounds of formula I wherein A represents (a) a phenyl radical bearing the following substituents:
- (α) as first substituent nitro, cyano or chlorine,
- (β) a second substituent selected from hydrogen, nitro, cyano, chlorine, bromine, lower alkylsulphonyl, lower alkoxycarbonyl and di-(loweralkyl)aminosulphonyl and
- (γ) a third substituent selected from hydrogen, chlorine and bromine, (b) benzothiazolyl-(2)-substituted by chlorine, nitro, cyano, thiocyano, lower alkoxy or lower alkylsulphonyl, and (c) benzoisothiazolyl-(3) substituted by nitro.

Among the azo dyestuffs according to the invention those coupling products of formula I wherein A represents a phenyl radical containing a nitro group in p-position to the azo group, the phenyl radical being optionally further substituted by a cyano group, a lower alkylsulphonyl group, chlorine or bromine, especially however being further substituted in an o-position to the azo group by a cyano group, chlorine or bromine are particularly preferred.

Of particular interest in the invention is the use of dyestuffs of the formula

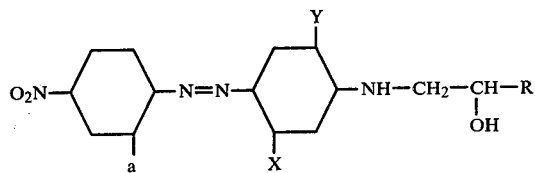

wherein a is cyano, chlorine or bromine, R is ethyl, phenyl or phenoxymethyl, Y is chlorine, bromine or lower alkoxy-carbonyl and X is hydrogen, lower alkyl or lower alkanoylamino.

Diazo components of formula II suitable for the carrying out of this process are, e.g. 1-amino-4-nitro-benzene, 1-amino-2,4-dicyanobenzene, 1-amino-2-cyano-4-chlorobenzene, 1-amino-2-cyano-4-nitrobenzene, 1-amino-2-chloro-4-nitrobenzene, 1-amino-2-cyano-4,6-dichloro-benzene, 1-amino-2-chloro-4-nitro-6-bromobenzene, 1-amino-2,6-dicyano-4-nitrobenzene, 1-amino-2,6-dichloro-4-cyanobenzene, 1-amino-2,6-dichloro-4-nitrobenzene, 1-amino-2-cyano-4-nitro-6-chlorobenzene, 1-amino-2-cyano-4-nitro-6-bromobenzene, 1-amino-2,4-dinitro-6-chlorobenzene, 1-amino-2-carbethoxy-4-nitrobenzene, 1-amino-2-methylsulphonyl-4-nitrobenzene, 1-amino-2-chloro-4-methylsulphonylbenzene, 1-amino-2,6-dichloro-4-methylsulphonylbenzene, 2-amino-6-thiocyanobenzothiazole, 2-amino-6-nitrobenzothiazole, 2-amino-6-cyanobenzothiazole, 2-amino-5,6-dichlorobenzothiazole, or 2-amino-6-methylsulfonylbenzothiazole.

The coupling components of formula III can be produced by the methods known per se, e.g. by addition of epoxy compounds of formula IV:

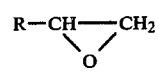 (IV)

wherein R represents an optionally substituted lower alkyl, cycloalkyl, aryl radical, or a carboxylic acid ester group, corresponding to the radicals $R_1$ or $R_2$, to amines of formula V:

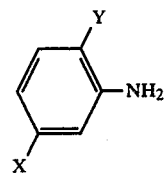 (V)

preferably at elevated temperature in the presence of glacial acetic acid as solvent, or boron trifluoride etherate as catalyst.

There can be formed by this addition two isomeric compounds of the formulae VIa and VIb

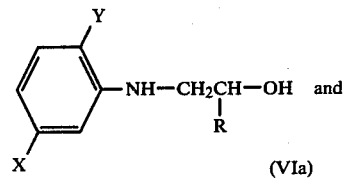

(VIa)

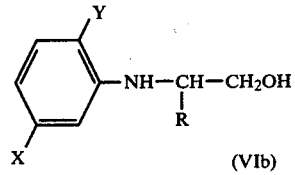

(VIb)

which are symbolised in the following by the general formula VI:

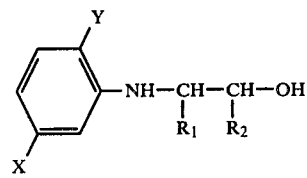 (VI)

wherein X, Y, $R_1$ and $R_2$ have the above stated meanings. These isomer mixtures contain, as a rule, an appreciably greater proportion of the compound of formula VIa, and this compound can, if required, be obtained analytically pure by means of distillation or recrystallisation. This degree of purification is, of course, not necessary for the industrial applicability of the resulting dyestuffs.

If Z represents in formula III an acyl radical, then the addition products of formula VI are acylated with one of the compounds introducing the acyl radical Z.

Suitable suchlike acylating agents are, e.g. the anhydrides of lower carboxylic acids such as acetic anhydride or propionic acid anhydride, and acyl chlorides and -bromides of the aliphatic series, e.g. acetyl or propionyl chloride or -bromide.

Particularly valuable dyestuffs of formula I, which are distinguished by, amongst other things, very good accessibility, a very high affinity to polyglycolterephthalate fibres, as well as by good stability in the boiling dye bath, and which, moreover, are fast to light and to sublimation, are obtained from coupling components of formula IIIa:

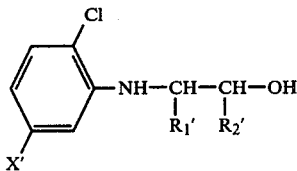 (IIIa)

wherein
X' represents hydrogen or a lower alkanoylamino group, and one of the symbols $R_1'$ and $R_2'$ represents hydrogen, and the other the grouping —(C-$H_2O)_{m-1}$—$R_3$, wherein m denotes 1 or 2, and $R_3$ denotes a lower alkyl radical, or preferably the phenyl group.

Further azo dyestuffs, according to the invention, which likewise are characterised by a good affinity and levelling property, as well as by good fastness to light and sublimation of the polyester dyeings produced therewith, are derived from coupling components to formula IIIb:

1-[N-($\beta$-acetoxy-$\gamma$-methoxypropyl)-amino]-2-chlorobenzene,
1-[N-($\beta$-acetoxy-$\gamma$-ethoxypropyl)-amino]-2-chlorobenzene,
1-[N-($\beta$-acetoxy-$\gamma$-phenoxypropyl)-amino]-2-chlorobenzene,
1-[N-($\beta$-acetoxy-$\gamma$-cyclohexyloxypropyl)-amino]-2-chlorobenzene,
1-[N-($\beta$-acetoxy-$\gamma$-phenoxypropyl)-amino]-2-chloro-5-methoxybenzene,
1-[N-($\beta$-acetoxy-$\gamma$-phenoxypropyl)-amino]-2-chloro-5-acetylaminobenzene,
1-[N-($\beta$-propionyloxy-$\gamma$-phenoxypropyl)-amino]-2-chlorobenzene,
1-[N-($\beta$-hydroxy-$\gamma$-methoxypropyl)-amino]-2-carbomethoxybenzene,
1-[N-($\beta$-hydroxy-$\gamma$-chloropropyl)-amino]-2-carbomethoxybenzene,
1-[N-($\beta$-hydroxy-$\gamma$-chloropropyl)-amino]-2-carbethoxybenzene,
1-[N-($\beta$-hydroxy-$\gamma$-acetyloxypropyl)-amino]-2-carbomethoxybenzene,
1-[N-($\beta$-hydroxy-$\beta$-phenylethyl)-amino]-2-carbomethoxybenzene,
1-[N-($\beta$-hydroxy-$\beta$-phenylethyl)-amino]-2-carbomethoxy-5-acetylaminobenzene,
1-[N-($\beta$-hydroxy-$\beta$-cyclohexylethyl)-amino]-2-carbomethoxybenzene,
1-[N-($\beta$-hydroxy-$\gamma$-phenoxypropyl)-amino]-2-carbomethoxybenzene,
1-[N-($\beta$-hydroxy-$\gamma$-phenoxypropyl)-amino]-2-carbomethoxy-5-acetylaminobenzene,
1-[N-($\beta$-hydroxy-$\gamma$-phenoxypropyl)-amino]-2-carboethoxybenzene,
1-[N-($\beta$-hydroxy-$\gamma$-cyclohexyloxypropyl)-amino]-2-carbomethoxybenzene,
1-[N-($\beta$-hydroxy-$\gamma$-benzyloxypropyl)-amino]-2-carbomethoxybenzene,
1-[N-($\beta$-hydroxy-$\gamma$-chloropropyl)-amino]-2-carbomethoxy-5-acetylaminobenzene,
1-[N-($\beta$-acetoxy-$\gamma$-chloropropyl)-amino]-2-carbomethoxybenzene,
1-[N-($\beta$-acetoxy-$\gamma$-bromopropyl)-amino]-2-carbomethoxybenzene,
1-[N-($\beta$-acetoxy-$\gamma$-methoxypropyl)-amino]-2-carbomethoxybenzene,
1-[N-($\beta$-acetoxy-$\gamma$-ethoxypropyl)-amino]-2-carbomethoxybenzene,
1-[N-($\beta$-acetoxy-$\gamma$-phenoxypropyl)-amino]-2-carbomethoxybenzene,
1-[N-($\beta$-acetoxy-$\gamma$-cyclohexyloxypropyl)-amino]-2-carbomethoxybenzene,
1-[N-($\beta$-acetoxy-$\gamma$-phenoxypropyl)-amino]-2-carbomethoxy-5-methoxybenzene,
1-[N-($\beta$-propionyloxy-$\gamma$-phenoxypropyl)-amino]-2-carbomethoxybenzene.

The coupling of the diazonium compound of an amine of formula II with a coupling component of formula III is performed by usual methods, preferably in strongly acid aqueous or organic-aqueous medium. The coupling product is isolated, in the case of mineral acid coupling, by gradually buffering the acid, e.g. with alkali metal salts of fatty acids having at most 5 carbon atoms such as sodium acetate.

Difficultly water-soluble azo dyestuffs of formula I according to the invention whereby Z represents an acyl radical can also be produced by reacting an azo dyestuff of formula VII:

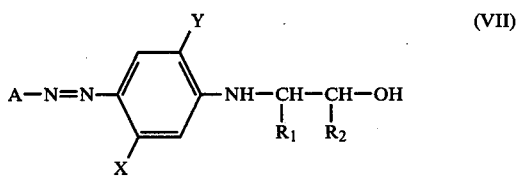 (VII)

wherein A, X, Y, $R_1$ and $R_2$ have the above given meanings with a compound introducing the acyl radical Z, whereby the starting materials are so chosen that the final dyestuff of formula I contains no water-solubilising groups which dissociate acid in water.

Azo compounds of formula VII are obtained, e.g. by coupling of the diazonium compound of an amine of formula II with a coupling component of formula VI, whereby the coupling is performed as described in the foregoing.

Suitable compounds introducing the acyl radical Z are, e.g. the previously stated acylating agents.

The reaction of the azo compounds of formula VII with the compounds introducing the acyl radical Z is performed in a suitable organic solvent such as glacial acetic acid or dioxane, optionally in the presence of an acid-binding agent such as sodium acetate, magnesium oxide, or pyridine.

The azo dyestuffs of formula I are yellow, orange, red, brown to violet, crystalline, difficultly water-soluble substances. They can be obtained analytically pure by recrystallisation from organic solvents, but such a purification is generally not necessary for their use in dyeing.

Azo dyestuffs according to the invention are suitable for the dyeing or printing of synthetic organic textile fibres, e.g. for the dyeing of textile fibres made from polymeric esters, such as cellulose 2- to 2½- or -triacetate, especially, however, for the dyeing or printing of textile fibres made from linear polyesters of aromatic polycarboxylic acids with polyvalent alcohols, particularly those made from polyethylene glycol terephthalate or polycyclohexane dimethylol terephthalate. These dyestuffs may also be used, however, for the dyeing of synthetic polyamide fibres, such as fibre material made from polyhexamethylene adipamide, polycaprolactam, or poly-ω-amino-undecanoic acid; as well as for the dyeing of polyolefin fibres, especially polypropylene fibres.

Depending on the composition, they are moveover suitable for the dyeing or pigmenting of lacquers, oils and waxes, as well as for the dyeing pigmenting of cellulose derivatives, particularly cellulose esters such as cellulose acetate, in the mass.

Preferably, the dyeing of the stated fibre materials with azo dyestuffs according to the invention is performed from aqueous dispersion. It is therefore advantageous for final dyestuffs of formula I usable as dispersion dyestuffs to be finely divided by being ground with surface-active dispersing agents, and possibly with further grinding auxiliaries.

Dispersing agents suitable for this purpose are, e.g. anionic tensides such as alkylaryl sulphonates, condensation products of formaldehyde with naphthalene sulphonic acid, and lignin sulphonates, or non-ionogenic tensides, e.g. fatty alcohol- or alkylphenylpolyglycol ether with a higher alkyl radical.

The dyeing of the polyester fibres with azo dyestuffs according to the invention from aqueous dispersion is performed by methods usual for polyester materials. Polyesters of aromatic polycarboxylic acids with polyvalent alcohols are preferably dyed at temperatures of above 100° C. under pressure. Dyeing may also be carried out, however, at the boiling point of the dye bath in the presence of dye carriers, e.g. phenylphenols, polychlorobenzene compounds, or similar auxiliaries; or by the pad-dyeing process with an aftertreatment in the heat, e.g. thermofixing at 180°–210° C. Cellulose-2- to -2½-acetate fibres are preferably dyed at temperatures of 80°–85° C., whereas cellulose triacetate fibres, as well as synthetic polyamide fibre material, are advantageously dyed at the boiling point of the dye bath. In the dyeing of the last-mentioned types of fibres, the use of dye carriers is not necessary.

The printing too of the stated textile materials is performed by the usual methods, e.g. by printing the material with the printing paste containing, in addition to the dyestuff and the dyeing accelerator, thickeners and the usual additives such as, e.g. urea; and subsequently fixing the dyestuff by steaming at 100°–130° C. for 15 minutes.

Final compounds of formula I according to the invention draw on to the aforestated synthetic organic textile fibres very well, especially on to polyethylene glycol terephthalate fibres, and produce on this fibre material pure, strong yellow, orange, scarlet, red violet, and brown dyeings which, moreover, have good fastness to washing, rubbing, perspiration, solvents, decatising, light, and sublimation. In this respect, mixtures of azo dyestuffs according to the invention behave particularly favourably.

Azo dyestuffs according to the invention are distinguished from comparable known dyestuffs by their very good affinity and levelling and build-up properties on polyethylene glycol terephthalate fibres.

The azo dyestuffs of formula I possess the valuable property of being able to cover on textured polyester fibres, e.g. Crimplene ®, the streakiness inherent in the material, and to render possible very deep and even dyeings which, moreover, have very good fastness properties, especially fastness to sublimation. The very good fastness to sublimation of these dyestuffs, combined with very good affinity and levelling and build-up properties, is surprising, since it is known to the expert that dispersion dyestuffs which are characterised by a good fastness to sublimation possess on polyester fibres, in the carrier-exhaust process, frequently only a very moderate affinity and build-up property, whereby this is particularly pronounced on textured polyester fibres.

Furthermore, azo dyestuffs according to the invention reserve vegetable and animal fibres well, particularly cotton and wool, which is of great technical importance in the dyeing of mixed fabrics. By virtue of the good fastness to sublimation of these dyestuffs, they can also be used very well in mixtures with other dispersion dyestuffs fast to sublimation for the dyeing of textile material using the pad-dyeing thermofixing process.

The new azo dyestuffs also possess good stability in boiling dye liquor.

The temperatures are given in degrees Centigrade in the following examples.

EXAMPLE 1

An amount of 16.3 g of 1-amino-2-cyano-4-nitrobenzene is diazotised in glacial acetic acid with an amount of nitrosylsulphuric acid corresponding to 6.9 g of sodium nitrite. The obtained diazonium solution is added dropwise at 0°–5° to a solution of 27.8 g of a mixture consisting of N-(β-hydroxy-γ-phenoxypropyl)-o-chloroaniline and N-(β-hydroxy-β'-phenoxyisopropyl)-o-chloroaniline in 800 ml of 90% acetic acid. The coupling solution is stirred for 16 hours, and the precipitated dyestuff mixture of the components of the formulae:

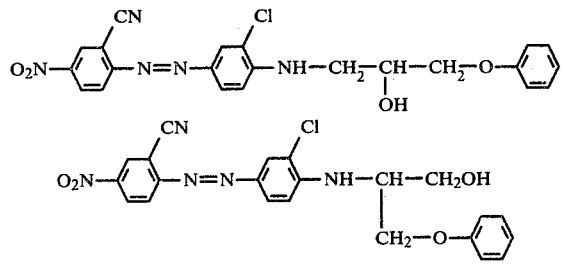

subsequently filtered off. It is washed with water until neutral, and dried at 60°–70° C. in vacuo.

After being ground with the sodium salt of a condensation product of naphthalene-2-sulphonic acid with formaldehyde, the said dyestuff mixture dyes polyethylene glycol terephthalate fibres, from aqueous dispersion in the presence of sodium-o-phenylphenolate as swelling agent, in yellowish red shades having very good fastness to light, washing, rubbing and sublimation.

The mixture, used as coupling component in this example, of ca. 95% of N-(β-hydroxy-γ-phenoxypropyl)-o-chloroaniline and 5% of N-(β-hydroxy-β'-phenoxyisopropyl)-o-chloroaniline is obtained by heating o-chloroaniline together with 1,2-epoxy-3-phenoxypropane, with the addition of catalytic amounts of boron trifluoride ethyl etherate, to 140°–160°.

EXAMPLE 2

An amount of 16.3 g of 1-amino-2-cyano-4-nitrobenzene is diazotised, in the usual manner, in 100 ml of concentrated sulphuric acid with an amount of nitrosylsulphuric acid corresponding to 6.9 g of sodium nitrate. The obtained diazonium solution is added dropwise at 0°–5° to a solution of 24.8 g of N-(β-hydroxy-β-phenylethyl)-o-chloroaniline in 600 ml of 80% acetic acid. The formed dyestuff of the formula:

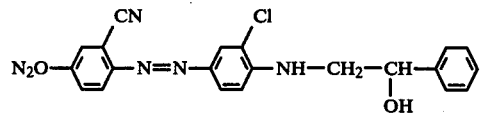

is precipitated by the addition of 50 g of sodium acetate; it is then filtered off, washed with water, and dried at 50°–60° in vacuo.

From a fine aqueous dispersion, this dyestuff dyes polyethylene glycol terephthalate fibres, e.g. Crimplene ®, in pure scarlet shades. The dyeings have good fastness to light, rubbing and sublimation.

The N-(β-hydroxy-β-phenylethyl)-o-chloroaniline, used as coupling component in this example, is obtained by adding at 150°–180° styrene oxide, in the presence of catalytic amounts of boron trifluoride ethyl etherate, to o-chloroaniline; and subsequently subjecting the reaction mixture to a high vacuum distillation treatment. N-(β-Hydroxy-β-phenylethyl)-o-chloroaniline distills at 155°–157° at a pressure of 0.3 mm Hg.

EXAMPLE 3

An amount of 16.3 g of 1-amino-2-cyano-4-nitro-1-benzene is diazotised in glacial acetic acid with an amount of nitrosylsulphuric acid corresponding to 6.9 g of sodium nitrite. The obtained diazonium solution is added dropwise at 0°–5° to a solution of 27.8 g of N-(β-hydroxy-γ-phenoxypropyl)-o-chloroaniline in 800 ml of 90% acetic acid. The coupling solution is stirring for 16 hours, and the precipitated dyestuff of the formula:

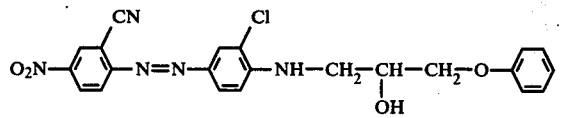

filtered off. It is washed with water until neutral, and dried at 60°–70° in vacuo.

After being ground with the sodium salt of a condensation product of naphthalene-2-sulphonic acid with formaldehyde, the said dyestuff dyes polyethylene glycol terephthalate fibres, from aqueous dispersion in the presence of sodium-o-phenylphenolate as swelling agent, in yellowish red shades having very good fastness to light, washing, rubbing, and sublimation.

The coupling component is produce as described in Example 1. The reaction mixture is subsequently distilled under high vacuum. N-(β-Hydroxy-γ-phenoxypropyl)-o-chloroaniline distills between 185°–190° at a pressure of 0.15 mm. Hg.

EXAMPLE 4

An amount of 22.8 g of 2-amino-6-methylsulphonylbenzothiazole is diazotised, in the usual manner, at −5°–0° in 200 ml of formic acid and 20 ml of sulphuric acid with an amount of nitrosylsulphuric acid corresponding to 6.9 g of sodium nitrite. The obtained diazonium solution is added dropwise at 0°–5° to a solution of 23.8 g of N-(β-hydroxy-γ-phenoxypropyl)-o-chloroaniline in 600 ml of glacial acetic acid and 100 ml of water, whereupon the dyestuff of the formula:

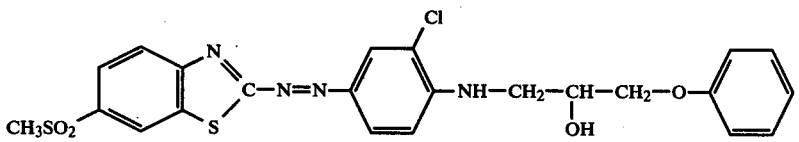

precipitates. It is filtered off, wshed with water, and dried at 60°–70° in vacuo. After being ground with lignin sulphonate, this dyestuff dyes polyethylene glycol terephthalate fibres, from aqueous dispersion, in very pure orange shades. The dyeings have good fastness to sublimation. The production of the coupling component used is described in Examples 1 and 3.

EXAMPLE 5

An amount of 16.3 g of 1-amino-2-cyano-4-nitrobenzene is diazotised in glacial acetic acid with an amount of nitrosylsulphuric acid corresponding to 6.9 g of sodium nitrite. The diazonium solution is added dropwise at 0°–5° to a solution of 35 g of a coupling component of the formula:

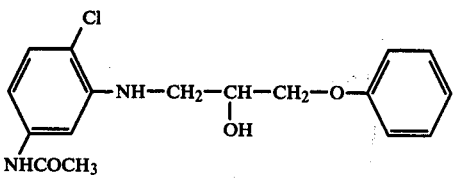

in a mixture of 150 ml of glacial acetic acid, 150 ml of concentrated hydrochloric acid and 125 ml of dioxane. The mixture is subsequently stirred for a further hour at the same temperature, whereupon the precipitated dyestuff of the formula:

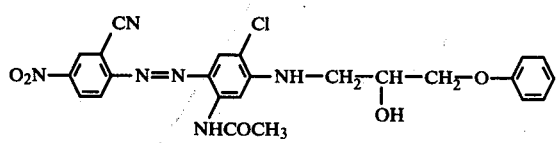

is filtered off; it is then washed first with 40% acetic acid and afterwards with water. After recrystallisation from glycol monoethyl ether, the obtained dyestuff has a melting point of 188°.

The brilliant bluish red dyeings produced with this dyestuff on polyethylene glycol terephthalate fibres are distinguished by good fastness to light, good fastness to wet processing and, in particular, by a very good fastness to sublimation. The coupling component used in this example is produced as follows:

5 Drops of boron trifluoride ethyl etherate are added to a mixture of 19.3 g of 1-acetylamino-3-amino-4-chlorobenzene, 25 ml of dioxane, and 19.1 g of 1,2-epoxy-3-phenoxypropane; and the mixture is stirred for 18 hours at 40°, and subsequently for a further 2 hours at 60°.

EXAMPLE 6

An amount of 16.3 g of 1-amino-2-cyano-4-nitrobenzene is diazotised, in the usual manner, in 100 ml of concentrated sulphuric acid. A solution is prepared separately of 32 g of N-($\beta$-acetoxy-$\gamma$-phenoxypropyl)-o-chloroaniline in 600 ml of 50% acetic acid. To this solution is slowly added dropwise at 0°–5° the above described diazonium solution, whereupon the dyestuff of the formula:

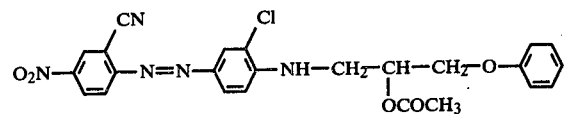

precipitates. It is filtered off, washed with water, and recrystallised from alcohol/dioxane (1:1).

This dyestuff dyes polyethylene glycol terephthalate fibres, from aqueous dispersion, in scarlet shades; the obtained dyeings have very good fastness to rubbing, to light and to sublimation.

The N-($\beta$-acetoxy-$\gamma$-phenoxypropyl)-o-chloraniline used in the example as coupling component is obtained by acetylation of N-($\beta$-hydroxy-$\gamma$-phenoxypropyl)-o-chloroaniline, the preparation of which is described in the Examples 1 and 3, with acetyl chloride in pyridine at 20°–30°.

If, in the preceding Examples 2 to 6, the diazo component be replaced by the corresponding amount of one of the diazo components given in Column II of the following table 1, and this coupled, under the conditions described in the above examples, with corresponding amounts of one of the coupling components listed in Column III, then dyestuffs are obtained which produce on polyethylene glycol terephthalate fibres dyeings possessing similarly good properties, the shades of which appear in the last column of the table.

TABLE 1

| I Example | II Diazo component | III X | Y | Z | n | $\beta$ | IV Shade on polyethylene glycol terephthalate fibres |
|---|---|---|---|---|---|---|---|
| 7 | 4-Cl, 2-NH₂, O₂N- | H | Cl | H | 2 | —O—phenyl | reddish orange |
| 8 | 2,6-diCl, 4-NH₂, O₂N- | H | Cl | H | 2 | —O—phenyl | yellow-brown |
| 9 | 2-COOC₂H₅, 4-NH₂, O₂N- | H | Cl | H | 2 | —O—phenyl | orange |
| 10 | 6-nitrobenzothiazol-2-yl amine | H | Cl | H | 2 | —O—phenyl | red |
| 11 | 5,6-dichlorobenzothiazol-2-yl amine | H | Cl | H | 2 | —O—phenyl | scarlet |
| 12 | 2-CN, 4-NH₂, O₂N- | H | Br | H | 1 | phenyl | scarlet |
| 13 | " | H | Cl | H | 2 | Cl | red |
| 14 | " | H | Cl | H | 2 | —OCH₃ | yellowish |

TABLE 1-continued

III

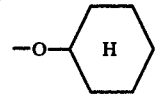

| I Example | II Diazo component | X | Y | Z | n | β | IV Shade on polyethylene glycol terephthalate fibres |
|---|---|---|---|---|---|---|---|
| 15 | " | H | Cl | H | 2 | 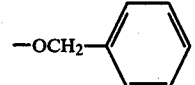 | red yellowish red |
| 16 | " | H | Cl | H | 2 | —OCH₂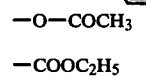 | yellowish red |
| 17 | " | H | Cl | H | 2 | —O—COCH₃ | yellowish red |
| 18 | " | H | Cl | H | 1 | —COOC₂H₅ | yellowish red |
| 19 | " | H | Cl | H | 1 | —CH₃ | red |
| 20 | " | H | Cl | H | 1 | —C₂H₅ | red |
| 21 | " | NHCOCH₃ | Cl | H | 1 | —CH₃ | ruby red |
| 22 | " | NHCOCH₃ | Cl | H | 1 | —C₂H₅ | ruby red |
| 23 | " | NHCOCH₃ | Cl | H | 1 | 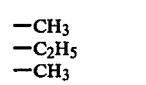 | ruby red |
| 24 | " | NHCOCH₃ | Cl | H | 2 | Cl | ruby red |
| 25 | 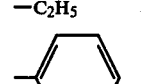 | H | Cl | H | 2 | Cl | orange |
| 26 | " | NHCOCH₃ | Cl | H | 1 | —C₂H₅ | red |
| 27 | " | NHCOCH₃ | Cl | H | 1 | —CH₃ | red |
| 28 | " | NHCOCH₃ | Cl | H | 2 | Cl | red |
| 29 | " | NHCOCH₃ | Cl | H | 1 |  | red |
| 30 |  | NHCOCH₃ | Cl | H | 1 | —CH₃ | red |
| 31 | " | NHCOCH₃ | Cl | H | 1 | —C₂H₅ | red |
| 32 | 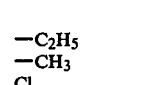 | H | Cl | —COCH₃ | 1 | 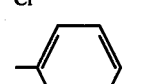 | scarlet |
| 33 | " | H | Cl | —COCH₃ | 1 | —CH₃ | scarlet |
| 34 | " | H | Cl | —COC₂H₅ | 1 | —C₂H₅ | scarlet |
| 35 | 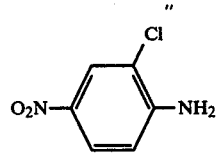 | H | Cl | —COCH₃ | 1 | —CH₃ | orange |
| 36 |  | H | Cl | —COCH₃ | 1 | 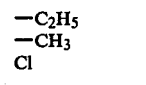 | reddish orange |
| 37 | 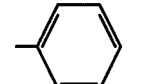 | H | Cl | H | 2 | 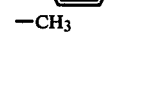 | yellow |

TABLE 1-continued

III: Ar-NH-CH$_2$-CH(OZ)-(CH$_2$)$_{n-1}$-β, with substituents Y (ortho) and X (para) on the ring.

| Example | Diazo component (II) | X | Y | Z | n | β | Shade on polyethylene glycol terephthalate fibres (IV) |
|---|---|---|---|---|---|---|---|
| 38 | 6-chloro-4-nitro-2-bromoaniline (Cl, O$_2$N, NH$_2$, Br) | H | Cl | —COCH$_3$ | 1 | phenyl | yellow-brown |
| 39 | 2-amino-5-nitrobenzenesulfonic acid dimethylamide (O$_2$N, NH$_2$, SO$_2$N(CH$_3$)$_2$) | H | Cl | H | 1 | —C$_6$H$_4$—CH$_3$ | orange |
| 40 | 2-amino-5-nitrobenzonitrile (O$_2$N, NH$_2$, CN) | H | Br | H | 2 | —O—phenyl | yellowish red |
| 41 | " | —CH$_3$ | Cl | —COCH$_3$ | 2 | —O—phenyl | red |
| 42 | " | H | Cl | H | 1 | cyclohexyl (H) | red |
| 43 | " | H | Cl | —COCH$_2$Cl | 1 | phenyl | yellowish red |
| 44 | 2,4-dicyanoaniline (NC, NH$_2$, CN) | H | Cl | H | 2 | —O—phenyl | reddish yellow |
| 45 | 2,5-dicyano-4-aminobenzene (NC, NH$_2$, CN) | H | Cl | H | 2 | —O—phenyl | orange |
| 46 | 2,5-dichloro-4-amino-N,N-dimethylsulfamoylbenzene ((CH$_3$)$_2$NSO$_2$, Cl, NH$_2$, Cl) | NHCOCH$_3$ | Cl | H | 2 | Cl | orange |
| 47 | " | NHCOCH$_3$ | Cl | H | 2 | —O—phenyl | orange |
| 48 | " | H | Cl | H | 1 | C$_2$H$_5$ | reddish yellow |
| 49 | " | H | Cl | H | 2 | Cl | reddish yellow |

TABLE 1-continued

| I Example | II Diazo component | III X | Y | Z | n | β | IV Shade on polyethylene glycol terephthalate fibres |
|---|---|---|---|---|---|---|---|
| 50 | $O_2N$–C$_6$H$_3$–NH$_2$ (4-nitroaniline) | NHCOCH$_3$ | Cl | H | 2 | –O–C$_6$H$_5$ | red |
| 51 | " | NHCOCH$_3$ | Cl | H | 1 | –C$_2$H$_5$ | red |
| 52 | 2-Cl, 4-$O_2N$-aniline | NHCOCH$_3$ | Cl | H | 2 | –O–C$_6$H$_5$ | red |
| 53 | 2-Cl, 4-(CH$_3$)$_2$NSO$_2$-aniline | H | Cl | H | 2 | –O–C$_6$H$_5$ | yellow |
| 54 | " | H | Cl | H | 1 | –C$_2$H$_5$ | yellow |
| 55 | " | NHCOCH$_3$ | Cl | H | 2 | –O–C$_6$H$_5$ | reddish yellow |
| 56 | " | NHCOCH$_3$ | Cl | H | 1 | –C$_2$H$_5$ | reddish |
| 57 | 2,6-di-Cl, 4-(CH$_3$)$_2$NSO$_2$-aniline | H | Cl | H | 2 | –O–C$_6$H$_5$ | yellow |
| 58 | " | H | Cl | H | 1 | –C$_2$H$_5$ | yellow |
| 59 | " | NHCOCH$_3$ | Cl | H | 2 | –O–C$_6$H$_5$ | reddish yellow |
| 60 | " | NHCOCH$_3$ | Cl | H | 1 | –C$_2$H$_5$ | reddish yellow |
| 61 | 2-Cl, 4-CH$_3$SO$_2$-aniline | H | Cl | H | 2 | –O–C$_6$H$_5$ | yellow |
| 62 | " | H | Cl | H | 1 | –C$_2$H$_5$ | yellow |
| 63 | " | NHCOCH$_3$ | Cl | H | 2 | –O–C$_6$H$_5$ | reddish yellow |
| 64 | " | NHCOCH$_3$ | Cl | H | 1 | –C$_2$H$_5$ | reddish yellow |
| 65 | 2,6-di-Cl, 4-CH$_3$SO$_2$-aniline | H | Cl | H | 2 | –O–C$_6$H$_5$ | yellow |
| 66 | " | H | Cl | H | 1 | –C$_2$H$_5$ | yellow |

TABLE 1-continued

III: Y-C6H3(X)-NH—CH₂—CH(OZ)—(CH₂)ₙ₋₁—β

| Example | Diazo component | X | Y | Z | n | β | Shade on polyethylene glycol terephthalate fibres |
|---|---|---|---|---|---|---|---|
| 67 | " | NHCOCH₃ | Cl | H | 2 | —O—C₆H₅ | reddish yellow |
| 68 | " | NHCOCH₃ | Cl | H | 1 | —C₂H₅ | reddish yellow |
| 69 | 2,5-dichloro-4-(dimethylsulfamoyl)aniline [(CH₃)₂NSO₂-, Cl, Cl, NH₂] | H | Cl | H | 2 | —O—C₆H₅ | reddish yellow |
| 70 | " | NHCOCH₃ | Cl | H | 1 | —C₂H₅ | orange |

EXAMPLE 71

An amount of 22.6 g of the dyestuff according to Example 3 is dissolved in 45 ml of absolute pyridine, and to the solution are then added 10 g of acetyl chloride. The mixture is heated to 100° and maintained at this temperature for 2 hours. It is subsequently cooled and poured on to 500 g of ice, whereupon the dyestuff of formula:

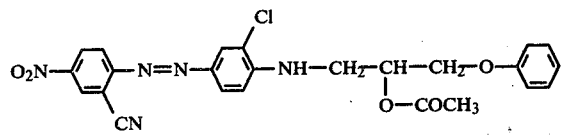

precipitates. It is filtered off, washed with water, and dried at 60°–70° in vacuo. This dyestuff is identical to the coupling product of Example 6.

EXAMPLE 72

An amount of 16.3 g of 1-amino-2-cyano-4-nitrobenzene is diazotised in glacial acetic acid with an amount of nitrosylsulphuric acid corresponding to 6.9 g of sodium nitrite. The obtained diazonium solution is added dropwise at 0°–5° C. to a solution of 30.1 g of a mixture consisting of 1-[N-(β-hydroxy-γ-phenoxypropyl)-amino]-2-carbomethoxybenzene and 1-[N-(β-hydroxy-β'-phenoxyisopropyl)amino]-2-carbomethoxybenzene in 800 ml of 90% acetic acid. The coupling solution is stirred for 16 hours, and the precipitated dyestuff mixture of the components of the formulae

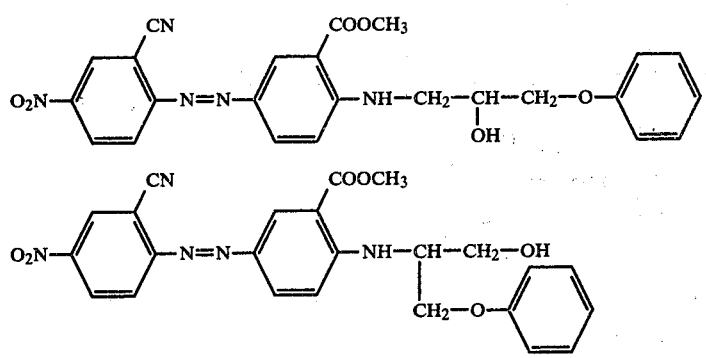

is subsequently filtered off. It is washed with water until neutral, and then dried at 60°–70° C. in vacuo.

After being ground with the sodium salt of a condensation product of naphthalene-2-sulphonic acid with formaldehyde, the said dyestuff mixture dyes polyethylene glycol terephthalate fibres, from aqueous dispersion in the presence of sodium-o-phenylphenolate as swelling agent, in scarlet shades having very good fastness to light, washing, rubbing, and sublimation.

The mixture, used as coupling component in this example, of ca. 95% of 1-[N-(β-hydroxy-γ-phenoxypropyl)-amino]-2-carbomethoxybenzene and 5% of 1-[N-(β-hydroxy-β'-phenoxyisopropyl)-amino]-2-carbomethoxybenzene is obtained by heating anthranilic acid methyl ester together with 1,2-epoxy-3-phenoxypropane, with the addition of catalytic amounts of boron trifluoride diethyl etherate to 140°–160° C.

EXAMPLE 73

An amount of 16.3 g of 1-amino-2-cyano-4-nitrobenzene is diazotised, in the usual manner, in 100 ml of concentrated sulphuric acid with an amount of nitrosylsulphuric acid corresponding to 6.9 g of sodium nitrite. The obtained diazonium solution is added dropwise at 0°–5° C. to a solution of 27.1 g of 1-[N-(β-hydroxy-β- phenylethyl)amino]-2-carbomethoxybenzene in 600 ml of 90% acetic acid. The formed dyestuff of the formula:

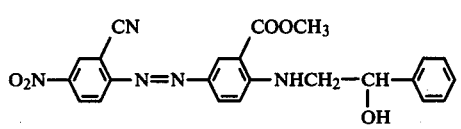

is precipitated by the addition of 50 g of sodium acetate; it is then filtered off, washed with water, and dried at 50°–60° C. in vacuo.

From fine aqueous dispersion, the dyestuff dyes polyethylene glycol terephthalate fibres in scarlet shades. The dyeings have good fastness to light, rubbing, and sublimation.

The 1-[N-(β-hydroxy-β-phenylethyl)-amino]-2-carbomethoxybenzene, used as coupling component in this example, is obtained by heating together at 150°–170° C. sytrene oxide and anthranilic acid methyl ester in the presence of catalytic amounts of boron trifluoride diethyl etherate.

EXAMPLE 74

An amount of 16.3 g of 1-amino-2-cyano-4-nitrobenzene is diazotised in glacial acetic acid with an amount of nitrosylsulphuric acid corresponding to 6.9 g of sodium nitrite. The obtained diazonium solution is added dropwise at 0°–5° C. to a solution of 30.1 g of 1-[N-(β-hydroxy-γ-phenoxypropyl)-amino]-2-carbomethoxybenzene in 800 ml of 90% acetic acid. The coupling solution is stirred for 16 hours, and the precipitated dyestuff of the formula:

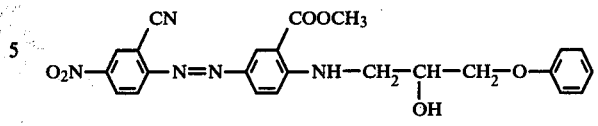

subsequently filtered off. It is washed with water until neutral, and dried at 60°–70° C. in vacuo.

After being ground with the sodium salt of a condensation product of naphthalene-2-sulphonic acid with formaldehyde, the said dyestuff dyes polyethylene glycol terephthalate fibres, from aqueous dispersion in the presence of sodium-o-phenylphenolate as swelling agent, in scarlet shades having very good fastness to light, washing, rubbing, and sublimation. The coupling component is produced as described in Example 1. The reaction mixture is, however, subsequently distilled under high vacuum. 1[N-(β-hydroxy-γ-phenoxypropyl)-amino]-2-carbomethoxybenzene distills between 142°–144° at a pressure of 0.5 mm. Hg.

If, in the preceding Examples 73 and 74 the diazonium component is replaced by the corresponding amount of one of the diazo components listed in Column II of the following table 2, and this coupled, under the conditions described in the above examples, with corresponding amounts of one of the coupling components given in Column III, then dyestuffs are obtained which produce on polyethylene glycol terephthalate fibres dyeings having similarly good properties, the shades of which appear in the last column of the table.

Table 2

| I Example | II Diazo component | III X | R | Z | n | β | IV Shade on polyethylene glycol terephthalate fibres |
|---|---|---|---|---|---|---|---|
| 75 | O₂N—⟨Cl,Cl⟩—NH₂ | H | —CH₃ | H | 2 | —O—C₆H₅ | yellow-brown |
| 76 | O₂N—⟨Cl⟩—NH₂ | H | —CH₃ | H | 2 | —O—C₆H₅ | orange |
| 77 | O₂N—⟨COOC₂H₅⟩—NH₂ | H | —CH₃ | H | 2 | —O—C₆H₅ | orange |
| 78 | O₂N—⟨SO₂CH₃⟩—NH₂ | H | —CH₃ | H | 2 | —O—C₆H₅ | scarlet |

Column III structure: phenyl with COOR, NH—CH₂—CH(OZ)—(CH₂)ₙ₋₁—β, and X substituent.

Table 2-continued

Coupler structure III:

$$\text{2-NH-CH}_2\text{-CH(OZ)-(CH}_2)_{n-1}\text{-}\beta,\ \text{1-COOR},\ \text{X on ring}$$

| Example | II Diazo component | X | R | Z | n | β | IV Shade on polyethylene glycol terephthalate fibres |
|---|---|---|---|---|---|---|---|
| 79 | 2-amino-3,5-dicyanophenyl (NC, CN, NH₂) | H | —CH₃ | H | 2 | —O—C₆H₅ (phenoxy) | reddish-orange |
| 80 | 2-amino-5-nitro-benzothiazole with -C(=NH)NH₂ (2-amidino-6-nitrobenzothiazolyl) | H | —CH₃ | H | 2 | —O—C₆H₅ | red |
| 81 | 2-amino-3-chloro-5-nitrophenyl | H | —CH₃ | H | 1 | —C₆H₅ | orange |
| 82 | 2-amino-3-methylsulfonyl-5-nitrophenyl | H | —CH₃ | H | 1 | —C₆H₅ | scarlet |
| 83 | 2-amino-5,6-dichloro-benzothiazol-2-yl (with —CH₃ on C2) | H | —CH₃ | H | 1 | —C₆H₅ | orange |
| 84 | 2-amino-3-cyano-5-nitrophenyl | H | —CH₃ | H | 2 | —O—C₆H₁₁ (cyclohexyloxy) | scarlet |
| 85 | " | H | —CH₃ | H | 2 | —Cl | scarlet |
| 86 | " | H | —CH₃ | H | 2 | —O—CH₂—C₆H₅ | scarlet |
| 87 | " | H | —CH₃ | H | 2 | —C₆H₅ | scarlet |
| 88 | " | H | —CH₃ | H | 2 | —O—CH₃ | scarlet |
| 89 | " | H | —CH₃ | H | 2 | —O—CH(CH₃)₂ | scarlet |
| 90 | 2-amino-3-chloro-5-nitrophenyl | H | —C₂H₅ | H | 2 | —O—C₆H₅ | orange |
| 91 | " | H | —CH₃ | H | 2 | —Cl | orange |
| 92 | " | H | —CH₃ | H | 2 | —O—CH₃ | orange |
| 93 | " | —CH₃ | —CH₃ | H | 1 | —C₆H₅ | orange |
| 94 | 4-amino-(N,N-dimethylsulfamoyl)phenyl ((CH₃)₂NSO₂—C₆H₄—NH₂) | H | —CH₃ | H | 2 | —C₆H₄—CH₃ (p-tolyl) | yellow |

Table 2-continued

Structure III:

$$\text{COOR at position 1, NH-CH}_2\text{-CH(OZ)-(CH}_2)_{n-1}\text{-}\beta \text{ at position 2, X at position 5}$$

| I Example | II Diazo component | X | R | Z | n | β | IV Shade on polyethylene glycol terephthalate fibres |
|---|---|---|---|---|---|---|---|
| 95 | 4-amino-2-formyl-benzonitrile (CN, CHO, NH₂) | H | —C₂H₅ | H | 2 | —O—C₆H₅ | reddish yellow |
| 96 | 2-chloro-6-bromo-4-nitroaniline | H | —CH₃ | H | 2 | —O—CH₃ | yellow brown |
| 97 | 4-nitroaniline | H | —C₂H₅ | H | 2 | —O—C₆H₅ | yellowish orange |
| 98 | " | H | —CH₃ | H | 2 | —O—CH₃ | yellowish orange |
| 99 | 2-chloro-4-methylsulfonylaniline | H | —CH₃ | H | 2 | —O—C₆H₅ | yellowish orange |
| 100 | 2,6-dichloro-4-methylsulfonylaniline | H | —CH₃ | H | 2 | —O—CH₃ | yellow |
| 101 | 2,6-dichloro-4-(N,N-dimethylsulfamoyl)aniline | H | —CH₃ | H | 2 | —O—C₆H₅ | yellow |
| 102 | " | H | —CH₃ | H | 1 | —C₆H₅ | yellow |
| 103 | 2-chloro-4-(N,N-dimethylsulfamoyl)aniline | H | —C₂H₅ | H | 2 | —O—C₆H₅ | yellow |
| 104 | " | H | —CH₃ | H | 2 | —O—CH₂—CH₃ | yellow |
| 105 | 2,5-dichloro-4-(N,N-dimethylsulfamoyl)aniline | H | —CH₃ | H | 2 | —O—C₆H₅ | yellow |
| 106 | 2-amino-3-cyano-5-nitro (CN, NO₂, NH₂) | H | —CH₃ | —COCH₃ | 2 | —O—C₆H₅ | yellowish red |
| 107 | " | H | —CH₂CH₃ | H | 2 | —O—CH₃ | scarlet |

Table 2-continued

Structure III:
$$\text{HOOC-R substituted benzene with } -NH-CH_2-CH(OZ)-(CH_2)_{n-1}-\beta \text{ and } X$$

| I Example | II Diazo component | X | R | Z | n | β | IV Shade on polyethylene glycol terephthalate fibres |
|---|---|---|---|---|---|---|---|
| 108 | 2-amino-5-nitrobenzonitrile (CN, O₂N, NH₂) | H | —CH₃ | —COCH₃ | 2 | —O—CH₃ | yellowish red |
| 109 | 2-amino-5-nitro-chlorobenzene (Cl, O₂N, NH₂) | H | —CH₃ | —COCH₃ | 2 | —O—C₆H₅ (phenoxy) | yellowish orange |
| 110 | " | H | —CH₃ | —COCH₃ | 2 | —O—CH₃ | yellowish orange |
| 111 | " | H | —CH₃ | H | 2 | —O—C₄H₉ | orange |
| 112 | 4-nitroaniline (O₂N—C₆H₄—NH₂) | H | —CH₃ | —COCH₃ | 2 | —O—C₆H₅ | reddish yellow |
| 113 | (H₃C)₂N—OC—C₆H₄—NH₂ | H | —CH₃ | H | 2 | —O—C₆H₅ | yellow |
| 114 | 2-amino-5-nitro-chlorobenzene | —NHOC—CH₃ | —CH₃ | H | 2 | —O—C₆H₅ | red |
| 115 | 2-amino-5-nitrobenzonitrile | —NHOC—CH₃ | —CH₃ | H | 2 | —O—C₆H₅ | bluish red |
| 116 | 2-amino-5-nitrobenzonitrile | H | —CH₃ | H | 1 | cyclohexyl (H) | red |
| 117 | " | H | —CH₃ | H | 1 | —COOCH₃ | red |
| 118 | " | H | —CH₃ | H | 1 | —COOC₂H₅ | red |
| 119 | 2-amino-3-nitrobenzonitrile (CN, O₂N, NH₂) | H | —CH₃ | H | 2 | —O—C₆H₅ | orange |
| 120 | H₅C₂—SO₂—C₆H₃(Cl)—NH₂ | H | —CH₃ | H | 2 | —O—C₆H₅ | orange |
| 121 | methyl 2-amino-5-nitrobenzoate (COOCH₃, O₂N, NH₂) | H | —CH₃ | H | 2 | —O—C₆H₅ | orange |
| 122 | 3-amino-6-nitrobenzisothiazole | H | —CH₃ | H | 2 | —O—C₆H₅ | bluish red |

Table 2-continued

Structure III:

$$\text{COOR-C}_6\text{H}_3(\text{X})-\text{NH}-\text{CH}_2-\text{CH(OZ)}-(\text{CH}_2)_{n-1}-\beta$$

| I Example | II Diazo component | X | R | Z | n | β | IV Shade on polyethylene glycol terephthalate fibres |
|---|---|---|---|---|---|---|---|
| 123 | 4-NC-benzothiazol-2-yl-amine | H | —CH₃ | H | 2 | —O—C₆H₅ | red |
| 124 | 4-NCS-benzothiazol-2-yl-amine | H | —CH₃ | H | 2 | —O—C₆H₅ | red |
| 125 | 4-H₃CO₂S-benzothiazol-2-yl-amine | H | —CH₃ | H | 2 | —O—C₆H₅ | red |
| 126 | 4-OCH₃, 6-O₂N-benzothiazol-2-yl-amine | H | —CH₃ | H | 2 | —O—C₆H₅ | red |
| 127 | 2-CN, 4-O₂N-aniline | —NHOC—C₂H₅ | —CH₃ | H | 2 | —O—C₆H₅ | bluish red |
| 128 | 2-CN, 4-O₂N-aniline | H | —CH₃ | H | 2 | —O—C₂H₅ | red |
| 129 | " | H | —CH₃ | H | 2 | —OCO—CH₃ | red |
| 130 | " | H | —CH₃ | H | 2 | —CN | red |
| 131 | " | H | —CH₃ | H | 2 | —Br | red |
| 132 | 2-CN, 4-O₂N-aniline | H | —CH₃ | H | 1 | —COO—CH(CH₃)₂ | red |
| 133 | " | H | —CH₃ | H | 1 | —COO—C₄H₉ | red |

EXAMPLE 134

An amount of 24 g of the dyestuff produced according to Example 74 is dissolved in 45 ml of absolute pyridine, and to the solution are added 10 g of acetyl chloride. The mixture is heated to 100° C., and maintained for 2 hours at this temperature. It is subsequently cooled and poured on to 500 g of ice, whereupon the dyestuff of the formula:

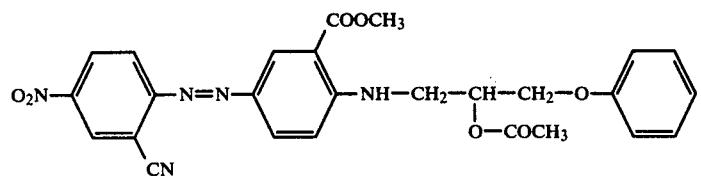

precipitates. It is filtered off, washed with water, and dried at 60°-70° in vacuo.

The dyestuff dyes polyethylene glycol terephthalate fibres, from a fine aqueous dispersion, in yellowish red shades. The dyeings have good fastness to light, to rubbing, and to sublimation.

EXAMPLE 135

An amount of 2 g of the dyestuff obtained according to Example 1 is dispersed in 400 g of water. To this dispersion are added, as swelling agent, 12 g of the sodium salt of o-phenylphenol and 12 g of diammonium phosphate; and 100 g of yarn made from polyethylene glycol terephthalate are dyes for 1½ hours at 95°-98°.

The dyeing is rinsed and aftertreated with aqueous sodium hydroxide solution and a dispersing agent.

In this manner is obtained a yellowish red dyeing having fastness to washing, to light, and to sublimation.

If, in the above example, the 100 g of polyethylene glycol terephthalate yarn are replaced by 100 g of cellulose triacetic fabric, this being dyed under the stated conditions and then rinsed with water, then a yellowish red dyeing is obtained having very good fastness to washing and to sublimation.

EXAMPLE 136

In a pressure dyeing apparatus, 2 g of the dyestuff obtained according to Example 2 are finely suspended in 2000 g of water containing 4 g of oleyl polyglycol ether. The pH-value of the dye bath is adjusted to 4–5 with acetic acid.

Into the dye bath are introduced 100 g of fabric made from polyethylene glycol terephthalate at 50°, the bath is heated within 30 minutes to 140°, and dyeing is carried out for 50 minutes at this temperature. The dyeing is afterwards rinsed with water, soaped and then dried. With maintenance of these conditions is obtained a scarlet dyeing which is fast to washing, perspiration, light, and sublimation.

The dyestuffs described in the other examples produce with this process dyeings of equal quality.

EXAMPLE 137

Polyethylene glycol terephthalate fabric is impregnated on a padding machine at 40° with a dye liquor of the following composition:
  20.0 g of the dyestuff obtained according to Example 1 finely dispersed in
  7.5 g of sodium alginate
  20.0 g of triethanolamine
  20.0 g of octyl phenol polyglycol ether, and
  900.0 g of water.

The fabric, squeezed out to ca. 100%, is dried at 100°, and subsequently fixed for 30 seconds at a temperature of 210°. The dyed material is rinsed with water, soaped, and then dried. Under these conditions is obtained a yellowish red dyeing which is fast to washing, rubbing, light and sublimation.

The dyestuffs described in the other examples produce with this process dyeings of equal quality.

What is claimed is:

1. A method for the dyeing of polyester textile fibers which comprises contacting the said polyester textile fibers with a dyeing composition containing as an essential component a dyestuff of the formula

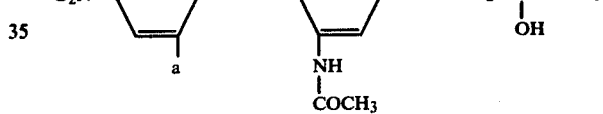

wherein a is cyano or chlorine.

2. A method according to claim 1 wherein in the dyestuff as defined a is cyano.

3. A method according to claim 1 wherein in the dyestuff as defined a is chlorine.

4. Polyester textile fiber material dyes with a dyeing composition containing as an essential component a dyestuff of the formula

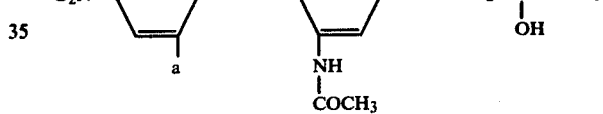

wherein a is cyano or chlorine.

* * * * *